US005680219A

United States Patent [19]
Rydningen

[11] Patent Number: 5,680,219
[45] Date of Patent: Oct. 21, 1997

[54] DEVICE FOR OPTICAL MEASUREMENT OF WIDTH/THICKNESS

[76] Inventor: Toni Rydningen, Kalstadhaven 10, N-3770 Kragerø, Norway

[21] Appl. No.: 545,671
[22] PCT Filed: Apr. 15, 1994
[86] PCT No.: PCT/NO94/00075
   § 371 Date: Mar. 4, 1996
   § 102(e) Date: Mar. 4, 1996
[87] PCT Pub. No.: WO94/24515
   PCT Pub. Date: Oct. 27, 1994

[30] Foreign Application Priority Data

Apr. 19, 1993 [NO] Norway ..................................... 931427

[51] Int. Cl.$^6$ ..................................................... G01B 11/00
[52] U.S. Cl. ............................................. 356/386; 250/559.25
[58] Field of Search ........................... 356/381, 384, 356/385, 386, 387; 250/559.24, 559.25, 559.27; 348/88

[56] References Cited

U.S. PATENT DOCUMENTS 4,179,707 12/1979 Sjödin ............................... 250/223 R

FOREIGN PATENT DOCUMENTS

| 168271 | 7/1985 | Norway . |
|---|---|---|
| 152987 | 12/1985 | Norway . |
| 210166 | 1/1967 | Sweden . |
| 449136 | 2/1983 | Sweden . |
| 447303 | 2/1986 | Sweden . |

Primary Examiner—Richard A. Rosenberger
Attorney, Agent, or Firm—Andrus, Sceales, Starke & Sawall

[57] ABSTRACT

A device for automatic, contactless and optical video measuring of the dimension of one or more objects at rest or being conveyed parallel along a straight path. In the measuring system a CCD video camera (5) through two parabola-shaped mirrors (3, 4), in the course of 6 to 12 lines, senses a section of the objects (7) to be measured, perpendicular to the direction of motion thereof. The parabola-shaped mirrors contribute to avoiding erroneous measurements, which otherwise arise due to camera optics and the varying distance to the objects to be measured. The object to be measured is illuminated obliquely by means of two elongated light sources (1, 2). Camera and mirrors are mounted in a dust-tight cabinet, allowing the contrast information of the object to be measured to pass only through an elongated aperture (8), covered by a glass adapted to shut out light of unfavorable wave length. The video information is electronically converted into TTL levels and digitized. Binary number representations for the dimension values are laid out to a communication gate, such that they can be fetched by a computer. The measurement takes place individually for each single object to be measured. Used as a kerf controller at saw or timber mill, the operator will be informed of the actual values, and an alarm could be given if the actual values differ from reference values by more than a predetermined limiting value.

9 Claims, 4 Drawing Sheets

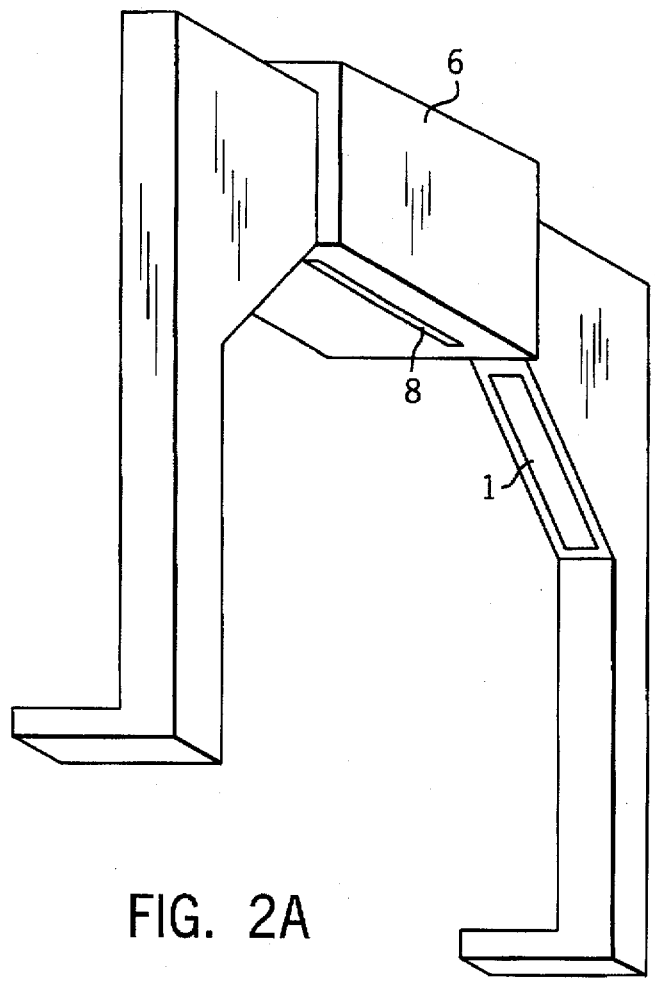
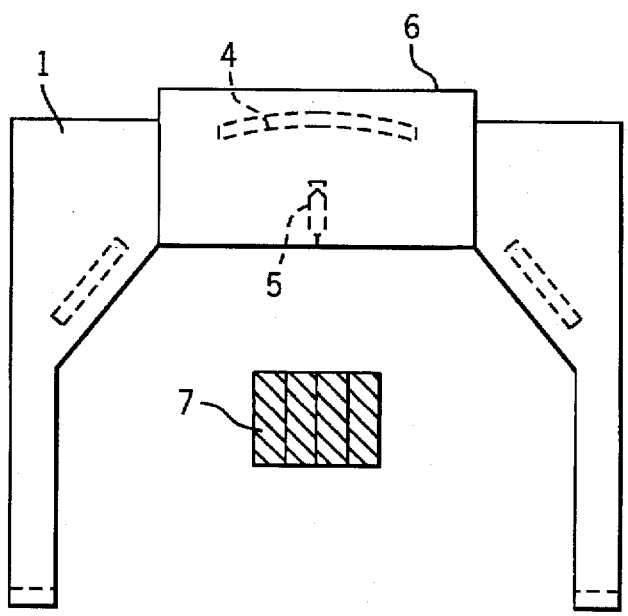
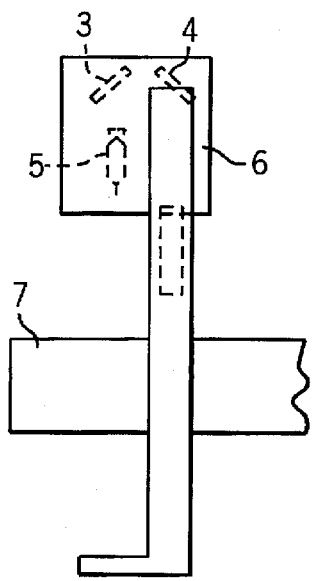
FIG. 2A
FIG. 2B
FIG. 2C

5,680,219

DEVICE FOR OPTICAL MEASUREMENT OF WIDTH/THICKNESS

BACKGROUND OF THE INVENTION

The present invention relates to a device for automatic, contactless and optical video measurement of the dimension of one or more objects being at rest, or being conveyed in parallel position along a straight path.

General description of the device, in this case used as sawn timber controller at a saw mill:

SUMMARY OF THE INVENTION

The invention could be used at e.g. a saw mill for continuous measurement of the saw-cuts (kerfs) in a block being sawn. The purpose is that an operator at the saw mill is informed of the actual values, and that an alarm is given if actual values differ more from the reference values set than a predetermined limit value. Also, the departure between actual value and reference value is to be used such that this value is transmitted to the saw controller system in order to correct the position of the saws.

The kerf controller in FIG. 1 measures contactless and simultaneously up to 10 parallel planks (in front edge of block during sawing) while these are moving, and without the use of any movable or rotating mechanical parts.

The measuring time for each single kerf is maximum 25 micro second. When measuring one unit only, 50 micro seconds are allowed to be used. As the measurements occur so rapidly, a major part of the problems linked to erroneous measurement caused by the fact that the measured object vibrates such that it displaces itself with or against the line search direction in the course of the search time. The measurements can be repeated at choosable intervals, and in those cases where the objects to be measured can be assumed to have such a high displacement speed in or toward the measuring direction that it would have significant effects on the measuring results, one may, by means of statistical calculations within the program communicating with the device, within frames, filter away the measuring deviations caused thereby. The system uses parabola-shaped mirrors of 4–6 mm thick tempered glass. Thereby, erroneous measurements otherwise arising due to the camera objective's opening angle and varying distance to the measured object are avoided. In this system, only a few individual components are included. All components are easily replaceable.

What is particularly achieved is that the saw mill, in the assurance that an alarm will be given upon deviations, can allow that one constantly saws using smaller margins (smaller excess dimensions). One could eliminate the problem of having to stop the sawing while carrying out manual sample controls. One avoids that some of the kerf must be discarded due to the fact that the saws or the adjustment thereof, have not been satisfactory for a period. Otherwise, one achieves a contactless, rapid and accurate measurement by means of a compact device. The latter is partly caused by the components used, and the way these are assembled; this being described later on.

In order to achieve this, two parabola-shaped mirrors 3, 4 according to FIG. 2 are required, the mirror coating being on the concave side, and thusly arranged that they, longitudinally, are located parallel with each other, the concave sides opposing each other under a mutual angle of 90° in the planes of the short sides of the mirrors. Further, it is required that a video CCD camera 5 is positioned such that the same, on some of the search lines, records a difference in the levels of the intensity of light beams coming from a measured object 7, and being reflected through both the two said parabola-shaped mirrors 3, 4. Additionally, two elongated light sources 1, 2 are required, placed laterally of and above, alternatively below, the measured object 7, such that the angle of the light sources in a plane perpendicularly to the measured object's direction of motion is 45°. The light sources are placed in this way in order to let the saw-cuts appear in the greatest possible contrast and, thereby, easier recordable by the video camera 5. It is further required that the video signal by means of electronics is converted into TTL logic and digitized such that it can be read by a computer.

From Norwegian patent NO 152,987 it is known a system for measuring the diameter of logs in that light from a light source illuminates a parabolic mirror. From the mirror, the light toward the object to be measured is reflected. On the basis of the shadow portion of the object formed on a detector, the diameter is found. Hence, according to said patent, use of parabolic mirror and light is known. However, it is important to note that, in accordance with FIG. 3 of said patent specification, a power driven rotating plane mirror is used, and that only one parabolic mirror is used in order to effect the measurement. In FIG. 4 of the patent specification two such mirrors are shown, positioned 90° against each other in the longitudinal direction, but this is caused by the fact that the measurement in the figure shown is carried out in two directions forming an angle of 90° relative to each other.

Norwegian Patent NO B 168,271 shows a device for optical measurement of elongate objects, such as sawn pieces of timber. The device comprises a camera, image processing devices and a mirror reflecting the image of the object. According to the laying-out publication, the mirror may have different shapes. However, it is not mentioned that the mirror necessarily must be parabola-shaped and concave. The intention with the invention is obviously to contract the image (reflection) of an elongated object more in the longitudinal direction than in the width direction of the object, such that merely the length or, simultaneously, both the width and the length of the object should be measureable by means of one and the same camera searching the surface of the mirror.

BRIEF DESCRIPTION OF THE SEVERAL VIEWS OF THE DRAWING

FIGS. 2A, 2B, and 2C are a bottom perspective view, front view, and side view, respectively, of the measuring device;

DETAILED DESCRIPTION OF THE INTENTION

Figure 1:
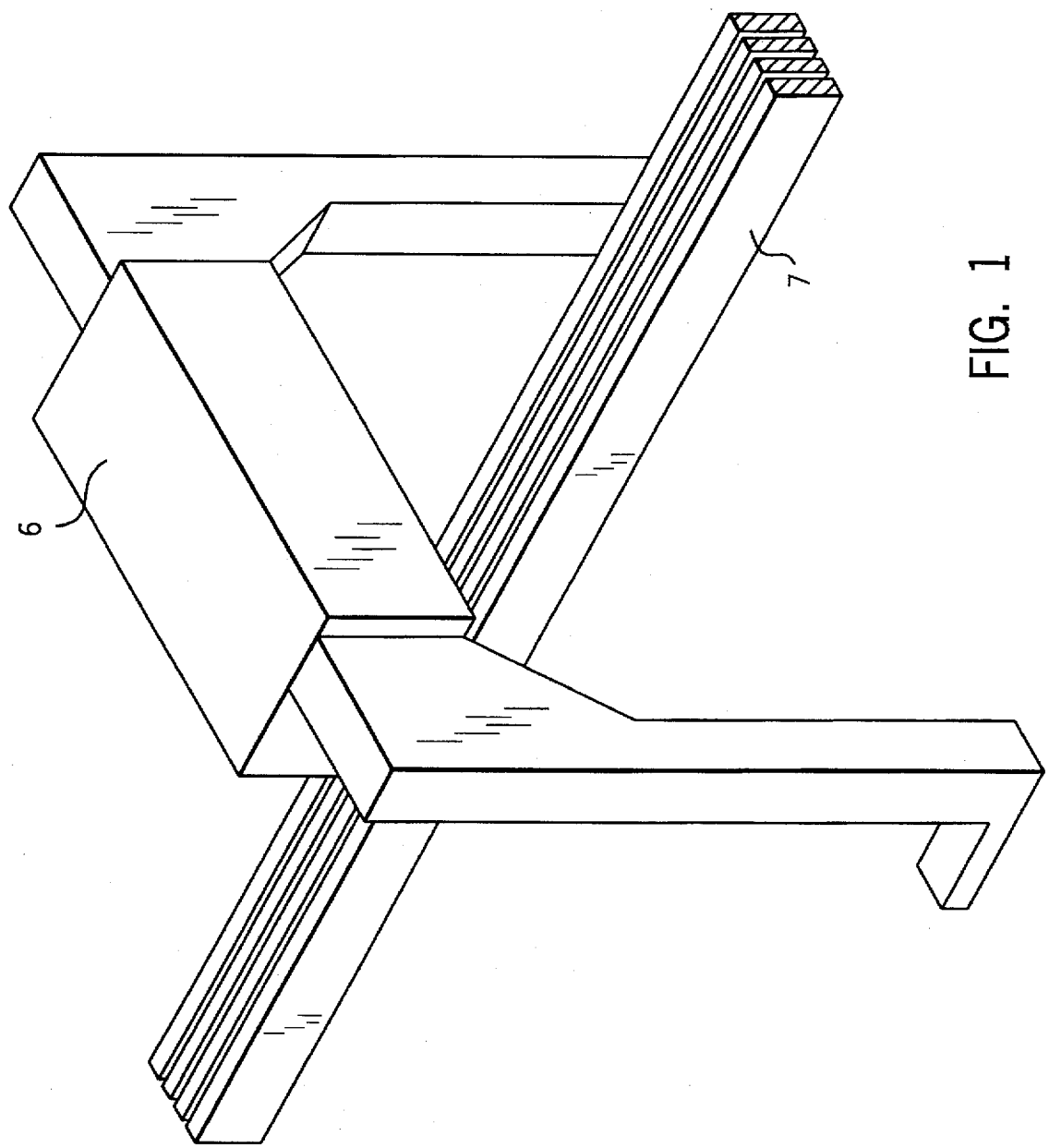
FIG. 1 is a top perspective view of the optical measurement device of the present invention.
Figure 3A:
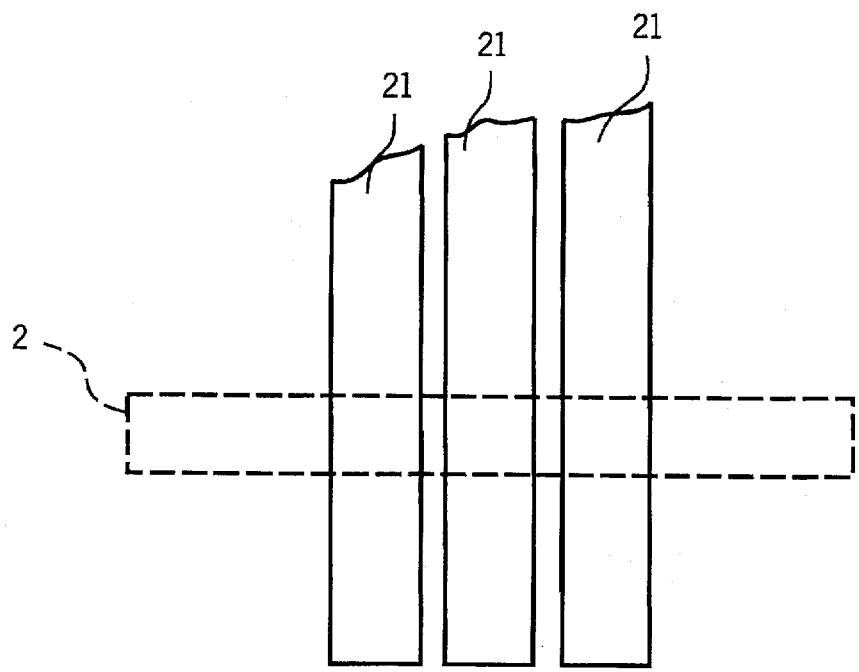
FIGS. 3A–3E illustrate the operation of the device.
Figure 3B:
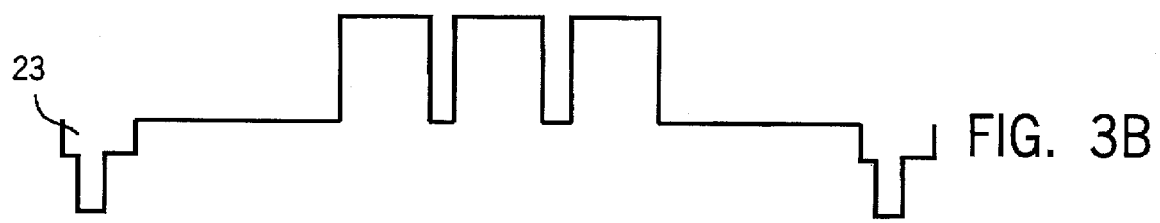
Figure 3C:
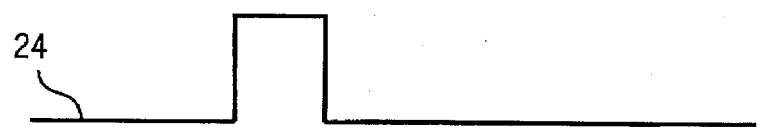
Figure 3D:
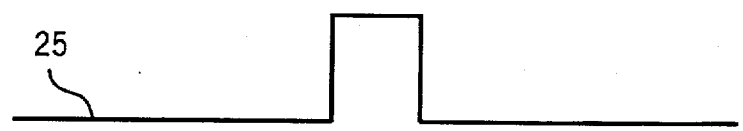
Figure 3E:
Figure 4A:
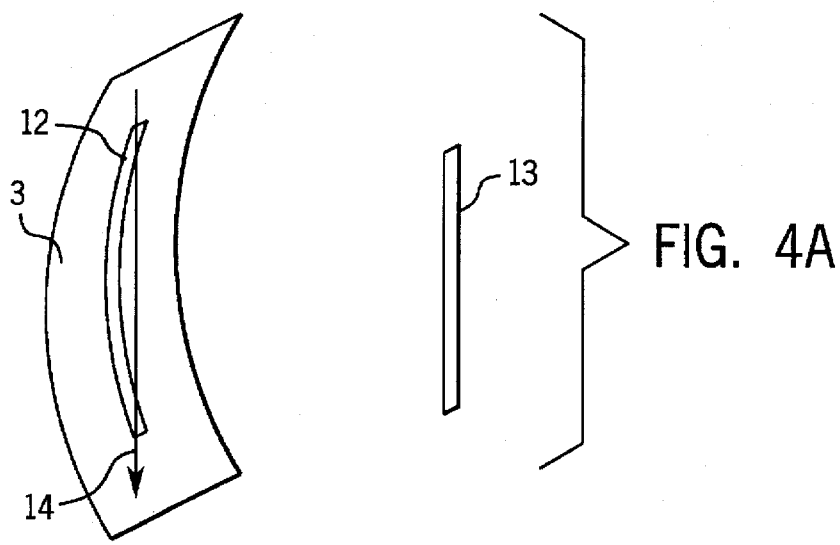
FIGS. 4A and 4B schematically illustrate circumstances arising in the operation of the measuring device.
Figure 4B:
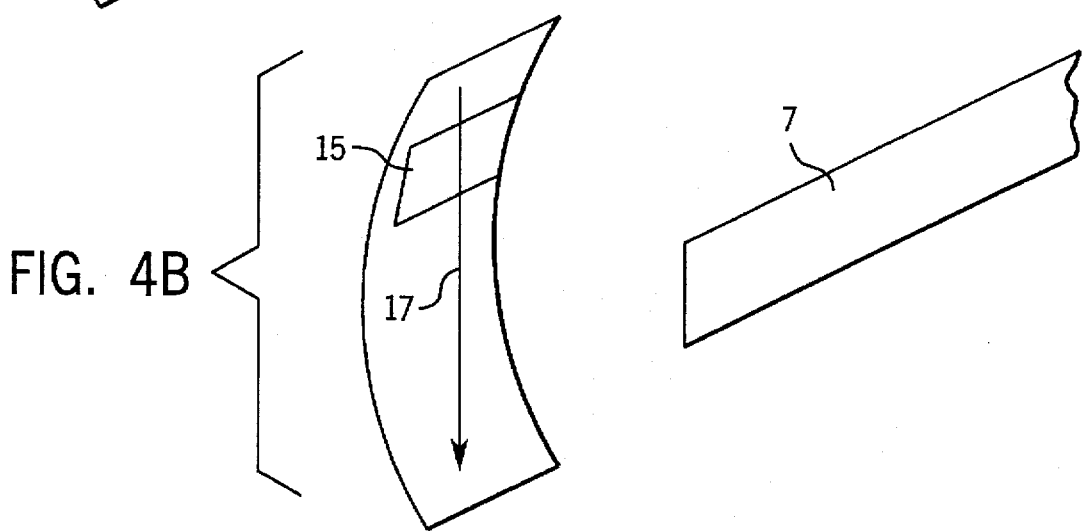
Figure 5:
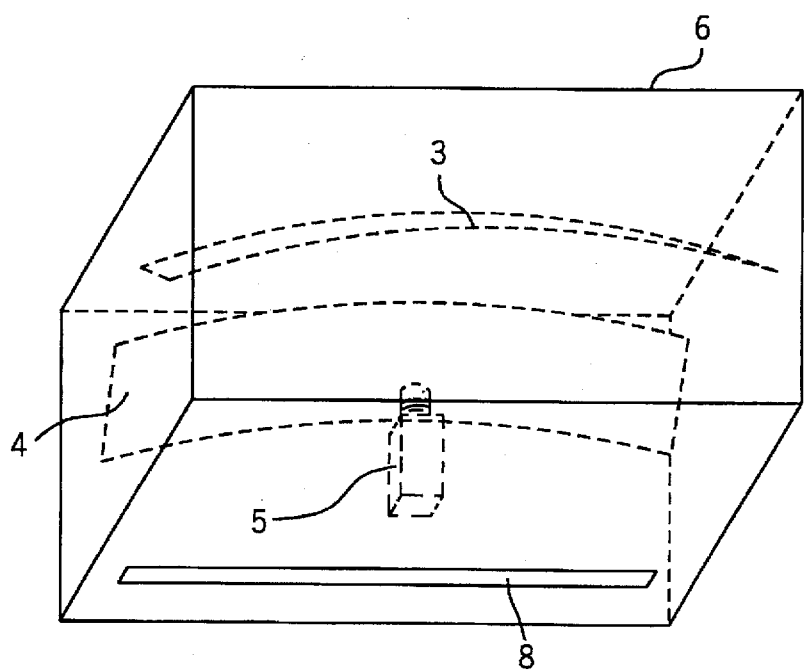
FIG. 5 is a perspective view of a portion of the measuring device of the present invention.

The novel and particular feature of the invention shown in FIGS. 1 and 2 as a kerf controller, is that it, in addition to measuring several dimensions simultaneously, has inclined light setting in from above and from both sides downwardly toward the measured object, such as shown in the illustrated examples in FIG. 2. Upon raising the light sources to a sufficient height above a base, e.g. light floors, this will entail that one nevertheless will be capable of maintaining the necessary contrast between the object being measured and the base. In the invention, two parabola-shaped mirrors are used, together with one CCD camera in such a combination that one, simultaneously as one avoids the deviations of the measuring values that might arise when the distance of the measured object from the camera varies, also avoids the use of motor and rotating plane mirrors or prisms. The camera which, in order to come away from its own measuring zone, looks obliquely into one mirror and searches along a straight line in the longitudinal direction of the mirror. As shown in FIG. 4, the camera will, because of its positioning, in the mirror 3 see a curved picture 12 of a straight line 13. The consequence will be that a camera searching a straight line 14, would sense only a small portion of the straight line's image (reflection) 12. FIG. 4, b, shows a deviation which would come into force if the width of the object 7 should be measured as a result of the camera searching along the line 17 over the image of the measured object 15. Here, it is obvious that the search would not occur perpendicularly to the side edges of the object. In order to counteract these unfortunate results, a second mirror number 4, which is quite equal to the first mirror, is mounted such that the concave sides of the two mirrors are turned 90° against each other in the plane of the short sides (narrow edges). FIG. 5 shows further how the two mirrors are placed relative to each other and to the camera. The fact that the angular positioning is in the plane of the short sides (short dimensions), is of substantial importance for this invention.

FIG. 1 shows an imagined constructive solution wherein the invention is used as a kerf controller at a saw mill.

The construction is based on the use of two parabola-shaped mirrors 3, 4, one camera 5 and one or two elongated light sources 1, 2.

Video information is converted into TTL levels and digitized. Binary number representations for the dimension of the measured object is laid out to a communication gate.

The device may either be defined to deliver digital values to the communication gate, or one may supply necessary software for communicating computer or PC.

The block 7 in FIG. 2, divided through several saw-cuts or kerfs, is seen by the camera 5. The dotted line 2 in FIG. 3 shows how small a part of the block the camera really sees. This is partly due to the width of the mirrors 3, 4 in FIG. 2, but also due to the narrow, elongated aperture 8 in the lower edge of the kerf controller in the same figure. The light passes only through this aperture 8 to the parabola-shaped mirrors 3, 4, and further through the camera objective to the camera's CCD chip.

Within the visual field 2 in FIG. 3, each of up to 6, or every other of up to 12 (optional) horizontal (perpendicular to the kerfs) searching lines are active (determined by the electronics) in the processing of the thickness dimensions being sawn. The active lines are situated between line No. 147 and line No. 160 or between 153 and 160. Each or every other line measures the thickness of a wood piece (plank) of their own. This makes it possible to achieve the shortest possible measuring time for each measured object. Thereby, erroneous measurements due to vibrations in the block being measured are avoided.

FIG. 3 shows the video information when a block is divided into three units 21. In this case, video information becomes analyzed in the course of every other of the 6 mutually following lines. In this example, it is presupposed that the printer reverser on the electronic card is placed in such a position that only every other line is processed.

Within the total number of lines enabled (here 12), the video information's number of positive transient courses per lines are counted. The transient course's number on the actual line is compared with the number line (here every other) searched within the enabled set of totally 12 lines. If line No. 1 (here 2) within the set is searched, a counter will run while the TTL converted (24) video information is high for the first time. If line No. 2 (here 4) is searched, the same counter, subsequent to resetting, runs while the TTL converted (25) video information is high for the second time. The course will continue for as many times as there are positive transients on the line being searched and which is enabled.

The counter values are laid out to communication gate in intervals of 64 micro seconds (here 128 micro seconds) in the course of a series. The time between each series can be set to a choosable value, either 20 or 40 milli seconds, i.e. for each or every other part image.

I claim:

1. A device for measuring the width dimension of an object, the width dimension of the object lying normal to an axis of the object, said device comprising:

a light source for illuminating an exposed surface of the object, the illumination occurring in a manner to create light variations responsive to width defining variations in the surface of the object;

a slot through which light reflected from the object may pass, the slit being oriented normal to the axis of the object;

a video camera having a viewing field containing a plurality of scanning lines searchable in a direction parallel to said slot;

mirror means for applying the reflected light passing through said slot to the viewing field of the camera, said mirror means comprising first and second concave, parabolic mirrors, the parabolic shape of the mirrors having a focal axis, the focal axes of the first and second parabolic mirrors lying normal to said slot and hence parallel to the axis of the object and in a common plane, said first parabolic mirror receiving the light passing through said slot, said first and second parabolic mirrors being arranged such that the concavities of said mirrors are facing each other, said second parabolic mirror receiving light reflected from said first parabolic mirror and applying it to the viewing field of said video camera to sense variations in the reflected light; and means coupled to said video camera for determining the width of the object to be measured from the sensed light variations.

2. The device as set forth in claim 1 wherein said light source comprises at least one light generating means providing a beam of light normal to the axis of the object and at an angle of 45° with respect to the object.

3. The device according to claim 2, wherein said light source comprises a pair of light generating means each providing a beam of light normal to the axis of the object and at an angle of 45° with respect to the object.

4. A device as set forth in claim 1 wherein said video camera comprises a CCD video camera having a lens aperture directed toward said second parabolic mirror.

5. A device as set forth in claim 1, characterized in that the scanning line search of the video camera occurs over 6–12 lines.

6. A device as set forth in claim 1, characterized in that two parabolic mirrors of tempered glass are used, mirror-coated on the concave side.

7. A device as set forth in claim 1, wherein said first and second parabolic mirrors are arranged so that the focal axes of the mirrors are lying at an angle of 90° to each other.

8. A device as set forth in claim 1, wherein said mirror means and video camera are mounted in a dust tight enclosure means having a transparent slot through which the reflected light may pass.

9. A device as set forth in claim 1, wherein the object is moved relative to said device in a transport direction parallel to the axis of the object.

* * * * *